US008585079B2

(12) United States Patent
Gorman et al.

(10) Patent No.: US 8,585,079 B2
(45) Date of Patent: Nov. 19, 2013

(54) AIRBAG MODULE FOR MOUNTING ON SEAT BOTTOM FRAME

(75) Inventors: David J Gorman, Royal Oak, MI (US); Scott D. Thomas, Novi, MI (US); Christopher J. Kehrig, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 97 days.

(21) Appl. No.: 13/181,139

(22) Filed: Jul. 12, 2011

(65) Prior Publication Data

US 2013/0015643 A1 Jan. 17, 2013

(51) Int. Cl.
 *B60R 21/207* (2006.01)
(52) U.S. Cl.
 USPC ............ 280/730.2; 280/728.2; 297/216.1
(58) Field of Classification Search
 USPC ............ 280/728.2, 730.1, 730.2; 296/187.12; 297/216.1, 216.13
 IPC .................................................. B60R 21/207
 See application file for complete search history.

(56) References Cited

U.S. PATENT DOCUMENTS

| 5,251,931 | A | * | 10/1993 | Semchena et al. | ........ | 280/730.1 |
| 5,564,736 | A | * | 10/1996 | Kim | ............ | 280/730.2 |
| 5,630,616 | A | * | 5/1997 | McPherson | ........ | 280/730.2 |
| 5,746,443 | A | * | 5/1998 | Townsend | ........ | 280/730.2 |
| 5,762,363 | A | * | 6/1998 | Brown et al. | ........ | 280/730.2 |
| 6,039,341 | A | * | 3/2000 | Doxey et al. | ........ | 280/728.2 |
| 6,126,192 | A | * | 10/2000 | Enders | ........ | 280/728.2 |
| 6,364,347 | B1 | * | 4/2002 | Holdampf et al. | ........ | 280/730.2 |
| 7,168,736 | B2 | * | 1/2007 | Tanase et al. | ........ | 280/730.2 |
| 7,318,601 | B2 | * | 1/2008 | Sugimoto et al. | ........ | 280/730.1 |
| 7,455,314 | B2 | * | 11/2008 | Ryan et al. | ........ | 280/729 |
| 8,360,464 | B2 | * | 1/2013 | Enders | ........ | 280/730.1 |
| 2004/0232666 | A1 | * | 11/2004 | Sato et al. | ........ | 280/730.2 |

* cited by examiner

*Primary Examiner* — Ruth Ilan
*Assistant Examiner* — Laura Freedman (57) ABSTRACT

An airbag module is mounted on the outboard side of a vehicle seat bottom frame having a vertical wall. An airbag assembly includes a housing, an inflator within the housing, and an airbag folded within the housing. A molded plastic airbag cover includes a top wall having an airbag opening therein through which the airbag is inflatable, and a vertical depending wall adapted to overlie the vertical wall of the seat bottom frame in spaced relation therefrom to conceal the airbag assembly. The vertical depending wall has mounting elements extending therefrom into engagement with the vertical wall of the seat bottom frame for mounting the airbag cover on the vertical depending wall of the seat bottom frame. The housing has fastener elements mounting the housing on the airbag cover. And the airbag cover has fastener elements thereon for mounting the airbag cover on the seat bottom frame.

24 Claims, 6 Drawing Sheets

AIRBAG MODULE FOR MOUNTING ON SEAT BOTTOM FRAME

FIELD OF THE INVENTION

The present invention relates to an airbag in a vehicle and more particularly provides a preassembled airbag module including both the airbag assembly and cover for mounting on the outboard side of the seat bottom frame.

BACKGROUND OF THE INVENTION

It is known in motor vehicles to provide an airbag mounted on the outboard side of the vehicle seat bottom so that the airbag will deploy upwardly between the occupant and the vehicle door.

The airbag conventionally includes a housing that is bolted to the bottom frame. One or more pieces of molded plastic trim are then attached onto the seat bottom frame to abut with the airbag and provide an aesthetically pleasing seat in which the structural inner workings of the airbag and the seat bottom are concealed from the view of the occupant user.

It would be desirable to provide a new and improved airbag for more efficient, economical, and aesthetically desirable mounting on a vehicle seat bottom frame.

SUMMARY OF THE INVENTION

An airbag module is mounted on the outboard side of a vehicle seat bottom frame having a vertical wall. An airbag assembly includes a housing, an inflator within the housing, and an airbag folded within the housing. A molded plastic airbag cover includes a top wall having an airbag opening therein through which the airbag is inflatable, and a vertical depending wall adapted to overlie the vertical wall of the seat bottom frame in spaced relation therefrom to conceal the airbag assembly. The vertical depending wall has mounting elements extending therefrom into engagement with the vertical wall of the seat bottom frame for mounting the airbag cover on the vertical depending wall of the seat bottom frame. The housing has fastener elements mounting the housing on the airbag cover. And the airbag cover has fastener elements thereon for mounting the airbag cover on the seat bottom frame.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings.

DETAILED DESCRIPTION OF THE EXEMPLARY EMBODIMENTS

The following description of certain exemplary embodiments is merely exemplary in nature and is not intended to limit the invention, its application, or uses.

Figures 1, 7:
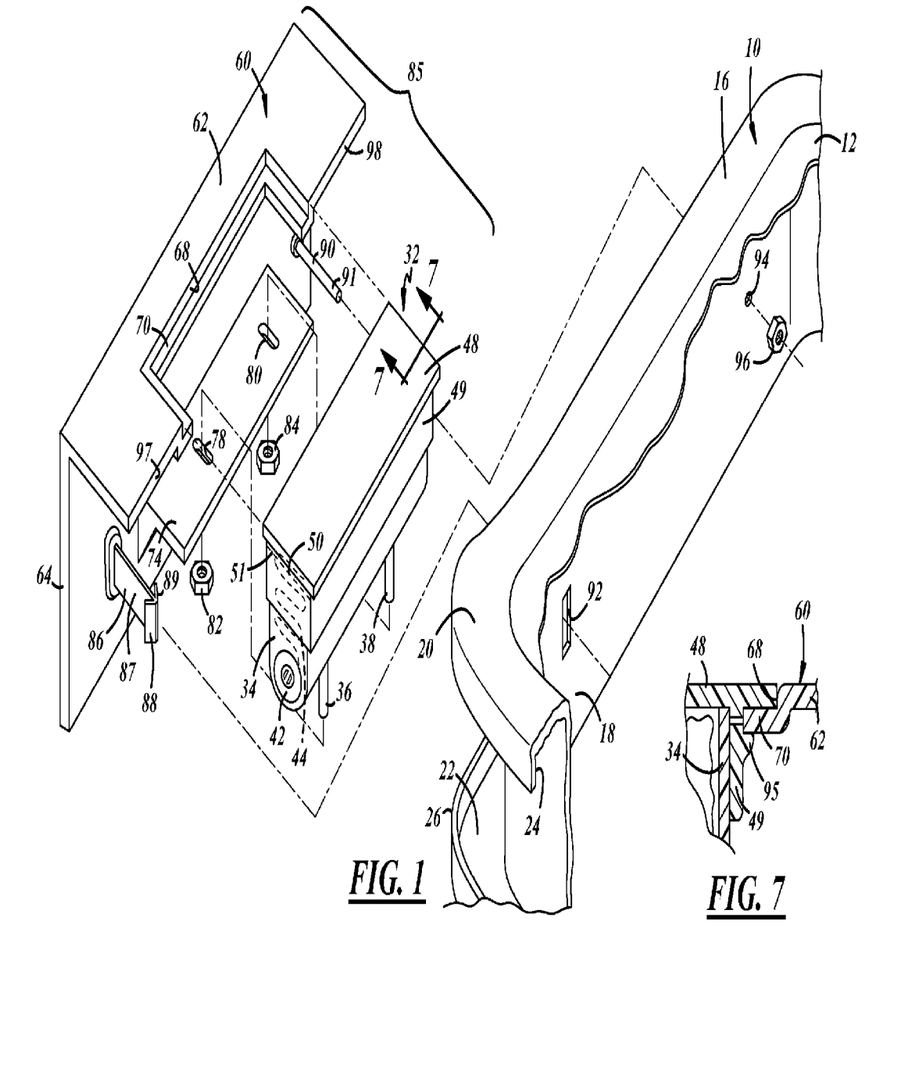
FIG. 1 is an exploded view of an airbag module for mounting on the outboard side of the seat bottom frame.
FIG. 7 is a section view taken in the direction of arrows 7-7 of FIG. 1.

Referring to FIG. 1, a vehicle seat has a seat bottom frame 10 that supports a seat pan 12. The bottom frame 10 is mounted on the vehicle body by seat adjusters, not shown, to permit fore and aft adjusting movement of the seat on the vehicle body. A foam cushion, not shown, is mounted on the seat pan 12 for seating of a vehicle occupant.

As seen in FIG. 1, the seat bottom frame 10 includes a C-shaped channel 16 that can be integral with the seat bottom frame 10. Alternatively, the C-shaped channel 16 can be a separate part that is welded or attached onto the outboard side of the seat bottom frame 10. As seen in FIG. 1, the C-shape of the C-shaped channel 16 includes a vertical wall 18, a top wall 20, a bottom wall 22, a downturned flange 24 that extends from the top wall 20, and an upturned flange 26 that extends from the bottom wall 22.

An airbag assembly, generally indicated at 32, includes a housing 34 which may be of stamped steel, diecast metal, cast metal, or molded plastic construction. The housing 34 has fastener elements thereon, particularly, threaded studs 36 and 38, that extend downwardly from the bottom of the housing 34 and may be attached to an inflator 42. The housing 34 contains inflator 42 and a folded airbag 44 that overlies the inflator 42. The top of the housing 34 is closed by a molded plastic closure panel 48. As seen in FIG. 1 and FIG. 7, closure panel 48 has depending sidewalls 49 that surround the housing 34 and are suitably attached thereto to mount the closure panel 48 on the housing 34. For example, tabs (not shown) can be bent off the housing 34 and inserted into rectangular window cutouts on the closure panel sidewalls 49. A tear seam 50, shown in FIG. 1, is provided by a plurality of slits 51 provided in three of the four sidewalls 49 of the cover 48. Upon activation of the inflator 42, the inflating airbag 44 will cause the closure panel 48 to tear at the tear seam 50, allowing the airbag 44 to inflate upwardly between the seated occupant and the vehicle door.

A molded plastic airbag cover, generally indicated at 60, is made of molded plastic and includes a top wall 62 and a vertical wall 64. The top wall 62 has a top opening 68 that has an open side facing toward the seat bottom frame 10. The top opening 68 of the top wall 62 is framed by a peripheral rim 70. An airbag mounting bracket 74 is molded integrally with the vertical wall 64 of the airbag cover 60. As seen in FIGS. 1 and 7, the mounting bracket 74 is a horizontal shelf that projects inwardly from the vertical wall 64 to underlie the top opening 68 of the airbag cover 60. Mounting bracket 74 has slots 78 and 80 therein that will receive the threaded studs 36 and 38.

The airbag assembly 32 is mounted on the airbag cover 60 by dropping the airbag assembly 32 downwardly into the top opening 68 so that the closure panel 48 of the airbag assembly 32 will come to rest upon the peripheral rim 70 and the threaded studs 36 and 38 will extend downwardly through the slots 78 and 80 of the mounting bracket 74. In addition, the sidewalls 49 of closure panel 48 have a plurality of tabs 95 that will snap over the peripheral rim 70 of the airbag cover 60.

Although the drawings show that the peripheral rim 70 surrounds three sides of the airbag assembly 32, it is also possible to have additional material on the airbag cover 60 to provide a peripheral rim that surrounds all four sides of the airbag assembly 32.

Nuts 82 and 84 are installed onto the threaded studs 36 and 38 so that the airbag assembly 32 is thereby attached to the airbag cover 60. It will be appreciated that this attachment of the airbag assembly 32 onto the airbag cover 60 may be performed at the factory of the manufacturer of the airbag assembly 32 and then shipped to the seat assembly plant or vehicle assembly plant as a preassembled module 85. Alternatively, the module 85 can be assembled at the seat assembly plant and then installed upon the seat as a unit. Or, the module 85 can be assembled at the vehicle assembly plant and then installed upon the seat as a unit at the vehicle assembly plant. In each case, by preassembling the various components to form the preassembled module 85, more efficient handling and assembly is enabled, in order to reduce costs, improve quality, and improve fit and finish.

The preassembled module 85 includes integral fastening elements for mounting the preassembled module 85 onto the seat bottom frame 16. Referring again to FIG. 1, a fastener element 86 is molded integrally to the vertical wall 64 and includes a stem 87 and prongs 88 and 89. Another fastener element 90 is also provided on the vertical wall 64 and is a threaded stud 91 that projects from the vertical wall 64. The prongs 88 and 89 of the fastener element 86 will be inserted through an opening 92 provided in the vertical wall 18 of the seat bottom frame 16, and will flex toward one another and then expand again to attach the one end of the airbag cover 60 to the seat bottom frame 16. The other fastener element 90 is inserted through a hole 94 provided in the seat bottom frame 16 and then a nut 96 is installed to complete the attachment and mounting of the airbag cover 60 onto the seat bottom frame 10. The fastener elements 86 and 90 may have integral shoulders that will engage with the vertical wall 18 of the seat bottom frame 16 so that the vertical wall 64 will be precisely spaced from the vertical wall 18. Optionally, other fastener arrangements can be utilized with multiple snap-in fasteners or threaded fasteners.

Thus, the preassembled module 85 is attached to the seat bottom frame 16 by attaching the airbag cover 60 to the seat bottom frame 16. The airbag assembly 32 is simultaneously mounted on the seat bottom frame 16 with cover 60 because the airbag assembly 32 has already been mounted on the airbag cover 60. Furthermore, as seen in FIG. 1, it will be understood that the inboard edge faces 97 and 98 of the top wall 62 of airbag cover 60 will engage with the downturned flange 24 of the C-shaped channel 18, or engage with a piece of seat trim fabric or other trim that may have been installed upon the seat bottom frame 16. In order to provide an aesthetically pleasing vehicle interior, it will be understood that the cover 60 and the closure panel 48 of the airbag assembly 32 will be of similar color and graining and will also preferably match the color and graining of the other plastic trim panels that are conventionally used to trim the seat bottom 10.

Figure 2:
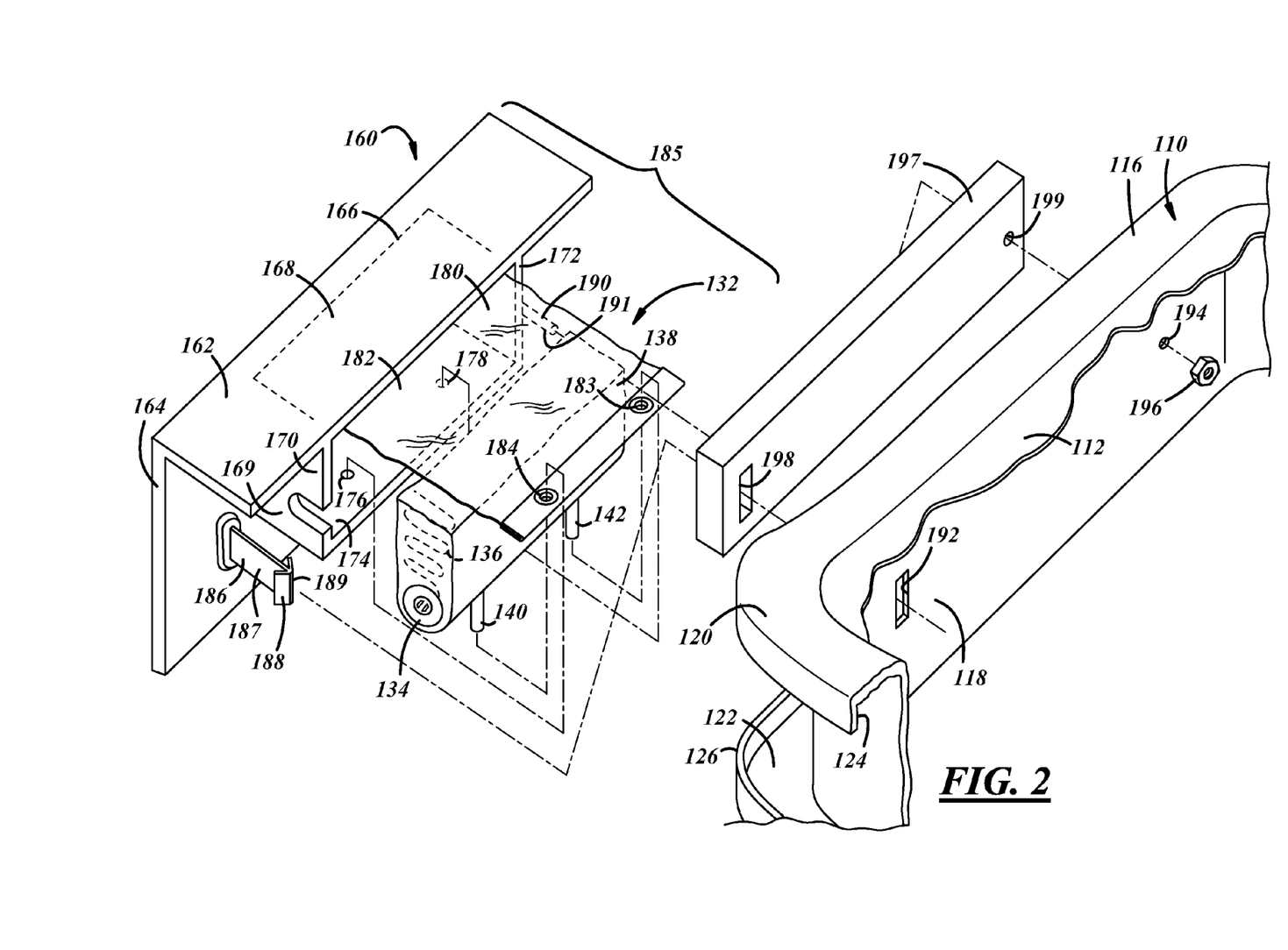
FIG. 2 is an exploded view similar to FIG. 1 showing another embodiment of the invention.

Referring to FIG. 2, a second embodiment of the invention is shown. A seat bottom frame 110 includes a C-shaped channel 116 that can be integral with the seat bottom frame 110, or, alternatively can be welded or otherwise attached onto the outboard side of the seat bottom frame 110. The channel 116 is C-shaped and includes a vertical wall 118, a top wall 120, a bottom wall 122, a downturned flange 124, and an upturned flange 126.

An airbag assembly, generally indicated at 132, is a so-called soft-pack airbag assembly in which an inflator 134 and a folded up airbag 136 are contained within a soft housing 138 that is constructed from flexible material such as nylon fabric or Mylar. A pair of threaded studs 140 and 142 extend downwardly from the inflator 134. When the inflator 134 is activated, the soft housing 138 will tear open to release the inflating airbag 136 typically at a weakened portion of the housing 138 that has small slots cut into it.

An airbag cover 160, of molded plastic, has a top wall 162 and a vertical wall 164. The top wall 162 has a tear seam 166 molded integrally therewith to create an integral airbag door 168 within the top wall 162 of the cover 160. The tear seam 166 is provided by a localized reduction in the thickness of the molded plastic of the airbag cover 160. The has him airbag cover 160 has an enclosure 169 molded integrally therewith and underlying the door 168. Enclosure 169 includes end walls 170 and 172 and a bottom wall 174. The bottom wall 174 has holes or slots 176 and 178 that will receive the threaded studs 140 and 142. The airbag cover 160 also has an airbag chute 180. The airbag chute 180 is a flexible material, such as nylon fabric or Mylar, and has a top edge 182 that is suitably attached to the airbag cover 160. The lower end of the chute 180 has a pair of eyelets 183 and 184. The airbag assembly 132 is assembled into the cover 160 by lifting the chute 180 and rotating the bottom edge of the chute 180 around the airbag assembly 132, and then slipping the eyelets 183 and 184 over the threaded studs 140 and 142. Then during insertion, the top of the airbag assembly 132 is compressed slightly as it is inserted into the enclosure 169 and threaded studs 140 and 142 are fitted through the holes or slots 176 and 178 of the bottom wall 174 of enclosure 169. A pair of nuts, not shown, are then threaded onto the threaded studs 140 and 142. Thus, it will be understood that the airbag assembly 132 will have been attached onto the airbag cover 160 with the airbag assembly 132 encapsulated between the vertical wall 164, the enclosure end walls 170 and 172, the enclosure bottom wall 174, and the chute 180. Thus, the airbag assembly 132 and the airbag cover 160 are preassembled to form a module 185.

The vertical wall 164, of the airbag cover 160 has a fastener element 186 including a stem 187, and prongs 188 and 189. The other end of the vertical wall 164 has a fastener element 190 extending therefrom in the form of a threaded stud 191. The prongs 188 and 189 of the fastener element 186 will be inserted through an opening 192 provided in the vertical wall 118 of the seat bottom frame 110 to attach the one end of the airbag module 185 to the seat bottom frame 110. The other fastener element 190 is inserted through a hole 194 provided in the seat bottom frame 110 and then a nut 196 is installed to complete the attachment and mounting of the airbag module 185 onto the seat bottom frame 110.

FIG. 2 also shows an optional filler strip 197 that fits between the vertical wall 118 of the C-shaped channel 116 and the chute 180 to provide lateral positioning of the module 185 and/or additional resistance against the inflating airbag inflating into the space within the C-shaped channel 116. As seen in FIG. 2, this filler strip 197 has a slot 198 that receives the fastener element 186 and a hole 199 that receives the fastener element 190. This filler strip 197 can be made of metal or plastic foam or other material. Alternatively, fasteners 186 and 190 can have shoulders so that the filler strip 197 is not needed.

Figure 3:
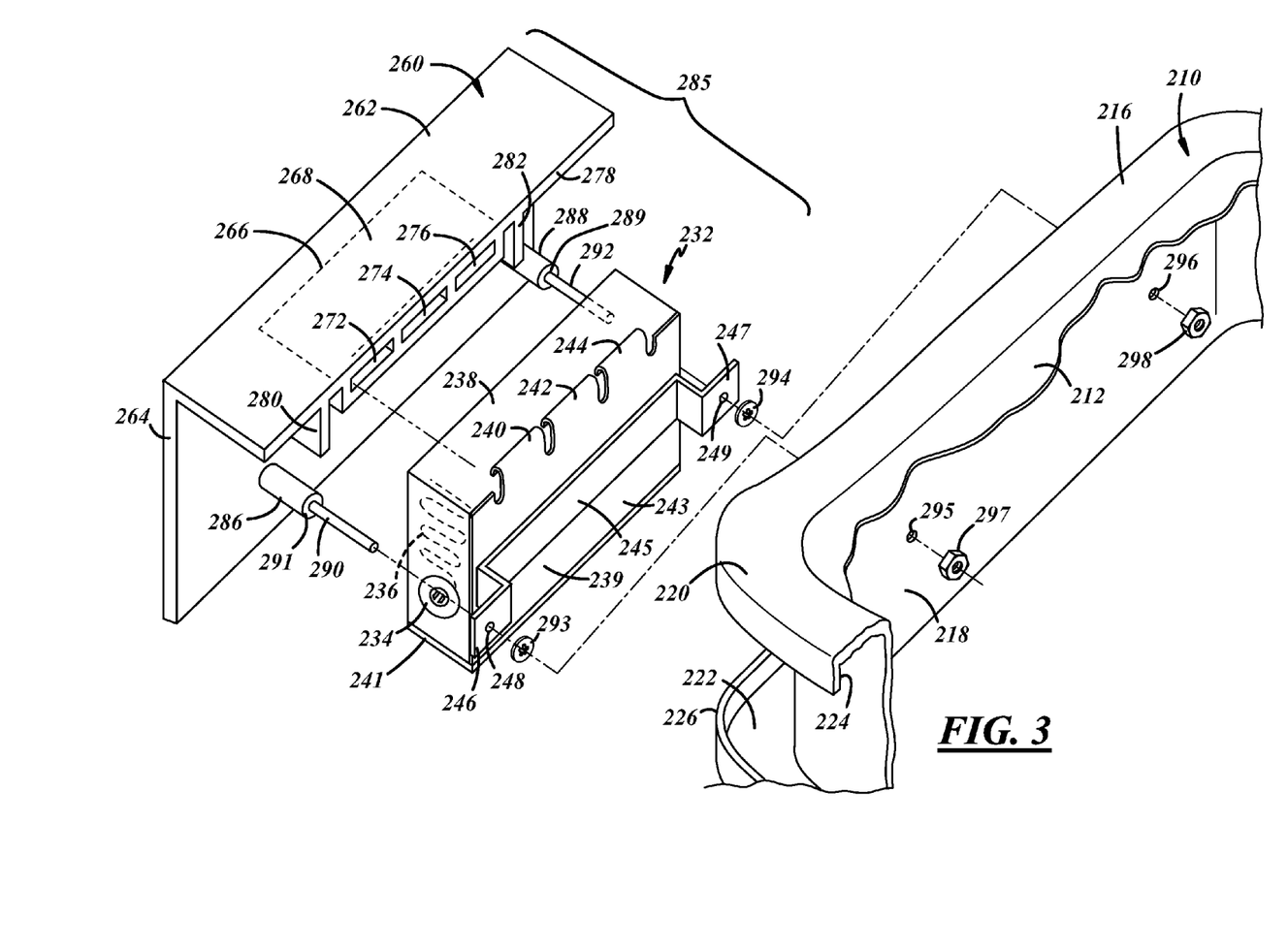
FIG. 3 is an exploded view showing yet another embodiment of the invention.

Referring to FIG. 3, a third embodiment of the invention is shown. A seat bottom frame 210 includes a C-shaped channel 216 that can be integral with the seat bottom frame 210. Alternatively, the C-shaped channel 216 can be a separate part that is welded or otherwise attached onto the outboard side of the seat bottom frame 210. The channel 216 is C-shaped and includes a vertical wall 218, a top wall 220, a bottom wall 222, a downturned flange 224, and an upturned flange 226.

An airbag assembly, generally indicated at 232, is a soft-pack airbag assembly in which an inflator 234 and a folded up airbag 236 are contained within a housing 238 that is sewn from flexible material such as nylon fabric or Mylar. The airbag assembly 232 includes a hanger bracket 239 of metal or molded plastic construction that is attached to the flexible material of the housing 238 via sewing or to the inflator 234 such as with a threaded fastener. As seen as in FIG. 3, the hanger bracket 239 includes a vertical wall 243 that is located on the side of the airbag assembly 232 that faces inboard toward the seat bottom frame 210. In addition, the hanger bracket 239 includes an integral floor 241 that underlies the housing 238 to assist in channeling the inflating airbag in the upward direction. The hanger bracket 239 has a plurality of downwardly bent hanger tabs 240, 242, and 244. The hanger tabs 240, 242, and 244 can be bent in the direction shown in FIG. 3 or in the opposite direction, pointing toward the right in FIG. 3. In addition, a bracket 245 is welded to the hanger bracket 239 and has bracket ends 246 and 247. A slot or hole 248 is provided in the bracket end 246 and a slot or hole 249 is provided in the bracket end 247.

A molded plastic airbag cover, generally indicated at 260, is made of molded plastic and includes a top wall 262 and a vertical wall 264. The top wall 262 has a tear seam 266 molded integrally therewith to create an integral airbag door 268 within the top wall 262 of the cover 260. The tear seam 266 is provided by a localized reduction in the thickness of the molded plastic of a top wall 262 of the airbag cover 260. The airbag cover 260 has integrally molded hanger rods 272, 274, and 276 on the underside of the top wall 262 at an inboard edge 278 thereof. In addition, the top wall 262 has a pair of end walls 280 and 282 that extend downwardly from the top wall 262 at the ends of the molded hanger rods 272 and 276.

The airbag assembly 232 and the airbag cover 260 are preassembled together to form an airbag module 285. In particular, the airbag assembly 232 will be rotated and oriented such that the hanger tabs 240, 242, and 244 can be hooked over hanger rods 272, 274, and 276 of the airbag cover 260. The rods 272, 274, and 276 may elastically deform to enable this insertion by minimizing the amount of necessary airbag module 285 rotation. The vertical wall 264 of the airbag cover 260 has fastener elements 286 and 288 provided thereon. The fastener element 286 is shown as being a threaded stud 290. The threaded stud 290 has a shoulder 291 that can be provided either integrally with the threaded stud 290, or can be provided by a plastic or metal collar that slides onto the threaded stud 290 Likewise, the fastener element 288 is shown as being a threaded stud 292, and has a shoulder 289. Upon assembling the airbag assembly 232 to the airbag cover 260, the threaded stud 290 will project through the slot 248 of the bracket 245, and the threaded stud 292 will project through the slot 249 of the bracket 245. In order to firmly connect the airbag assembly 232 to the airbag cover 260 for shipping and handling, a pair of push-on plastic washers or threaded nuts 293 and 294 can be installed onto the threaded studs 290 and 292.

The airbag module 285, comprised of the preassembled airbag assembly 232 and the airbag cover 260, will be installed onto the seat bottom frame 210 by inserting the threaded studs 290 and 292 through holes 295 and 296 provided in the seat bottom frame 210. Then nuts 297 and 298 are installed onto the threaded studs 290 and 292. The hanger bracket 239 will butt up against the downturned flange 224 and the upturned flange 226, or will butt up against fabric or plastic seat trim that may have been installed upon the seat bottom frame 210. In addition, the end walls 280 and 282 of the top wall 262 of the airbag cover 260 will prevent the airbag 236 from escaping forward or rearward inside cover 260, and the end walls 280 and 282 will focus the inflating airbag 236 upwardly so that the airbag 236 will burst through the door 268.

Figures 4, 8:
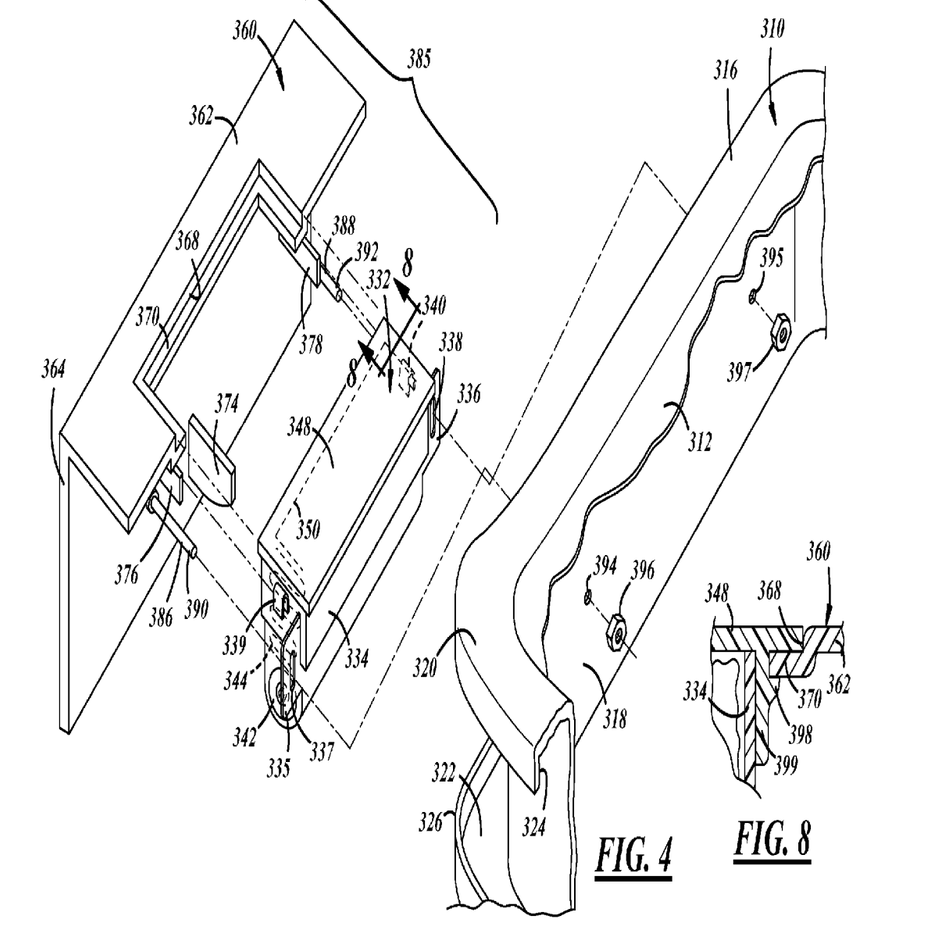
FIG. 4 is an exploded view showing still another embodiment of the invention.
FIG. 8 is a section view taken in the direction of arrows 8-8 of FIG. 4.

Referring to FIG. 4, a fourth embodiment of the invention is shown. A seat bottom frame 310 includes a C-shaped channel 316 that can be integral with the seat bottom frame 310. Alternatively, the C-shaped channel 316 can be a separate piece that is welded or otherwise attached onto the outboard side of the seat bottom frame 310. The C-shaped channel 316 includes a vertical wall 318, a top wall 320, a bottom wall 322, a downturned flange 324, and an upturned flange 326.

An airbag assembly, generally indicated at 332, includes a housing 334, which may be of stamped steel, diecast metal, cast metal, or molded plastic construction. The housing 334 has fastener elements thereon, particularly tabs 335 and 336 that extend from the ends of the housing 334. The tab 335 has a slot 337 and the tab 336 has a slot 338. In addition, the end of the housing 334 adjacent the tab 335 has a downturned hanger tab 339. Likewise, the end of the housing 334 adjacent the tab 338 has a downturned hanger tab 340. The housing 334 contains an inflator 342 and a folded airbag 344 that overlies the inflator 342. The top of the housing 334 is closed by a molded plastic closure panel 348 that is mounted on the housing 334 and has a tear seam 350. The molded plastic closure panel 348 may be attached to the housing 334 via hooks and slots or other features that will allow a floating condition to improve the fit to a plastic airbag cover 360. The tear seam 350 is provided by a localized reduction in the thickness of the molded plastic of the closure panel 348. Upon inflation of the airbag 344, the inflating airbag 344 will cause the closure panel 348 to tear the tear seam 350, allowing the airbag 344 to inflate upwardly between the seated occupant and the vehicle door.

As seen in FIGS. 4 and 8, molded plastic airbag cover, generally indicated at 360, is made of molded plastic and includes a top wall 362 and a vertical wall 364. The top wall 362 has a top opening 368 that has an open side facing toward the seat bottom frame 310. The top opening 368 of the top wall 362 is framed by a peripheral rim 370. An airbag mounting hook 374 extends inwardly from the vertical wall 364 to underlie the housing 334 of the airbag assembly 332. In addition, the airbag cover 360 has end walls 376 and 378 that are spaced below the top wall 362 and project inwardly from the vertical wall 364, as seen in FIG. 4.

The airbag assembly 332 and the airbag cover 360 are preassembled together to form an airbag module 385. In particular, the airbag assembly 332 will be oriented such that the closure panel 348 of the housing 334 will slide into the opening 368 and rest upon the peripheral rim 370 of the airbag cover 360. Simultaneously, the hanger tabs 339 and 340 of the housing 334 will slide onto the end walls 376 and 378 of the airbag cover 360. In addition, the bottom of the housing 334 will rest upon the mounting hook 374 that is able to bend slightly during module insertion to wrap around a portion of the bottom of the module to retain it.

The vertical wall 364 of the airbag cover 360 has fastener elements 386 and 388 provided thereon. The fastener element 386 is a threaded stud 390. Likewise, the fastener element 388 is shown as being a threaded stud 392. Upon assembling the airbag assembly 332 to the airbag cover 360, the threaded stud 390 will project through the slot 337 of the tab 335, and the threaded stud 392 will project through the slot 338 of the 336. In order to firmly connect the airbag assembly 332 to the airbag cover 360 for shipping and handling, a pair of push-on plastic washers or threaded nuts can be installed (as shown in FIG. 3) onto the threaded studs 390 and 392.

The airbag module 385, comprised of the preassembled airbag assembly 332 and the airbag cover 360 will be installed onto the seat bottom frame 310 by inserting the threaded studs 390 and 392 through holes 394 and 395 provided in the seat bottom frame 310. Then nuts 396 and 397 are installed onto the threaded studs 390 and 392. If desired a filler strip like the filler strip 197 of FIG. 2 can be employed in the embodiment of FIG. 4. In addition, the fastener elements 386 and 388 can have shoulders thereon that will engage against the vertical wall 318 of the seat bottom frame 310 in order to space the vertical wall 364 of the airbag cover 360 from the vertical wall 318.

Referring to FIG. 7, a cross-section is shown, in which it is seen that a leg 398 can extend downwardly from the closure panel 348 and carries a locking tab 399 that slides beneath the peripheral rim 370 of the airbag cover 360 to effectively retain the closure panel 348 on the airbag cover 360.

Figure 5:
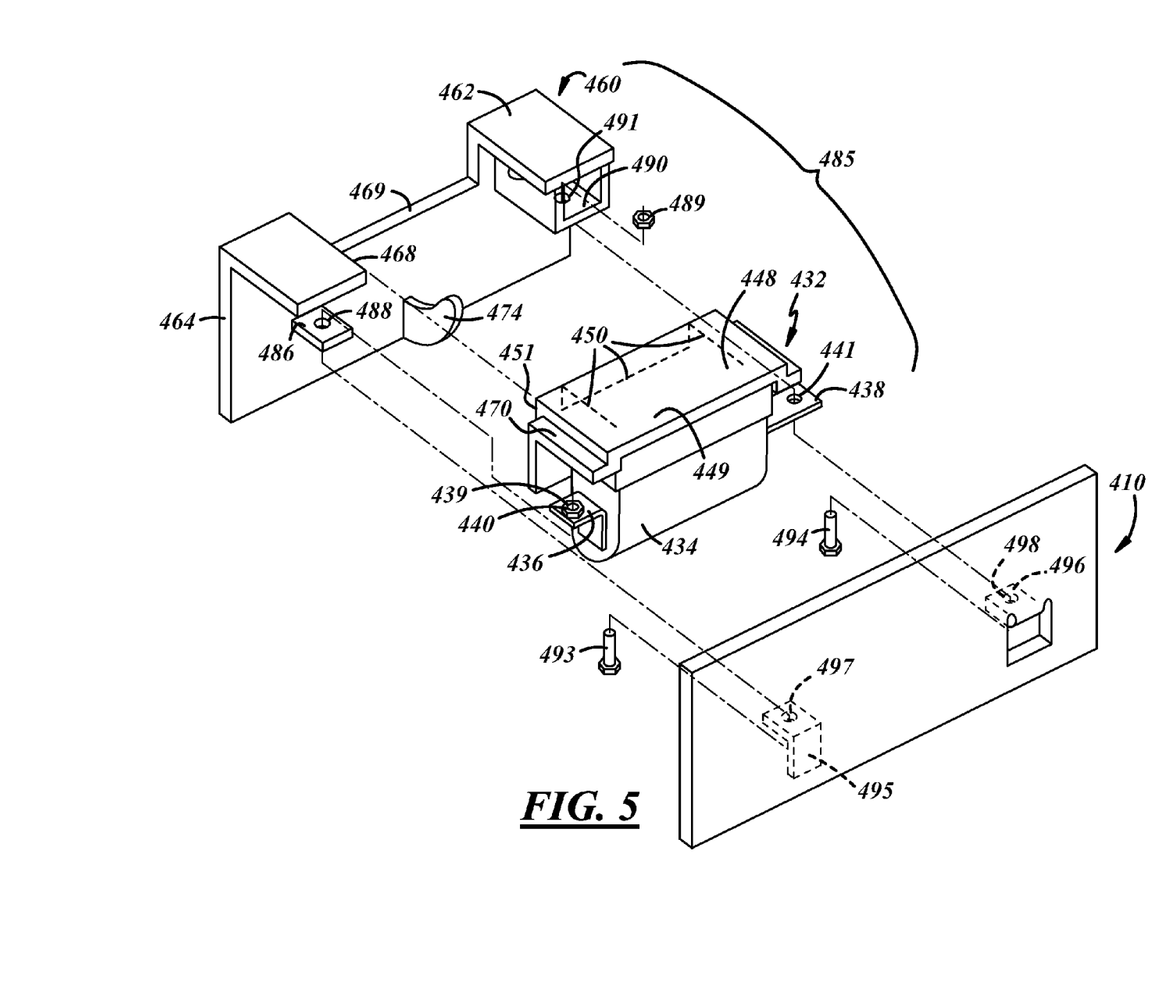
FIG. 5 is an exploded view showing yet still another embodiment of the invention.

Referring to FIG. 5 another embodiment of the invention is shown. In FIG. 5, the seat bottom frame 410 includes a generally planar sheet metal panel that can be integral with the seat or welded thereto.

An airbag assembly, generally indicated at 432, includes a housing 434. A fastener bracket 436 is attached to the housing 434 at one end, and a similar fastener bracket 438 is attached at the other end of the housing 434. Fastener bracket 436 has an aperture 439 and a nut 440 welded thereto. Fastener bracket 438 has an aperture 441. The airbag assembly 432 also has a closure panel 448 that closes the top of the airbag housing 434. The closure panel 448 has a top wall 449 and an outer vertical wall 451. A tear seam 450 is provided in the top wall 449 and in the vertical wall 451. A peripheral rim 470 is provided along the edges of the top wall 449 and the vertical wall 451. The housing 434 and the closure panel 448 would be joined in a similar manner as described for the FIG. 1 embodiment.

A molded plastic airbag cover, generally indicated at 460 is made of molded plastic and includes top wall 462 and vertical wall 464. Top wall 462 has a top opening 468 with an open side facing toward the seat bottom frame 410. The vertical wall 464 has a side opening 469 that communicates with the top opening 468. An airbag mounting hook 474 is molded integrally with the vertical wall 464 and extends inwardly therefrom. A tab 486 is molded integrally with the vertical wall 464 at the left-hand side of the airbag cover 460, and a slot or hole 488 is provided therein. At the right hand side of airbag cover 460, an abutment structure 490 is molded integrally with the top wall 462 and vertical wall 464 and has a slot 491. The airbag assembly 432 is mounted on the airbag cover 460 by sliding the airbag assembly 432 leftward into the airbag cover 460. The airbag housing 434 will snap over the airbag mounting hook 474, likely with some elastic deformation of the hook or module, as the bracket 436 will slide over top the tab 486 of the airbag cover 460. Simultaneously, the bracket 438 of the airbag assembly 432 will slide beneath the abutment 490 of the airbag cover 460. The engagement of tab 486 with bracket 436, the engagement of the airbag housing 434 with the airbag mounting hook 474, the engagement of the bracket 438 with the abutment structure 490, and the engagement of the closure panel 448 with the surrounding airbag cover 460, will cooperate to temporarily mount the airbag assembly 432 on the airbag cover 460, thereby forming an airbag module assembly 485.

The preassembled airbag module 485 will be subsequently attached to the seat frame 410. For this purpose, a mounting bracket 495 is welded to the seat bottom frame 410 and has a slot or hole 497. In addition, the seat bottom frame 410 has a tab 496 struck therefrom. The tab 496 has a hole or slot 498. The preassembled airbag module 485 will be assembled to the seat bottom frame 410 by positioning the airbag module 485 against the seat bottom frame 410 with tab 486 of the airbag cover 460 resting on the bracket 495, and the bracket 438 of the airbag assembly 432 resting on the tab 496. Then, a bolt 493 is installed upwardly through the hole 497, through the hole 488, and through aperture 439, and threads into the weld nut 440. In addition, a bolt 494 is installed upwardly through hole 498, through aperture 441, and through slot 491, where it is threaded into a nut 489 that is inserted into the cavity in abutment structure 490.

Figure 6:
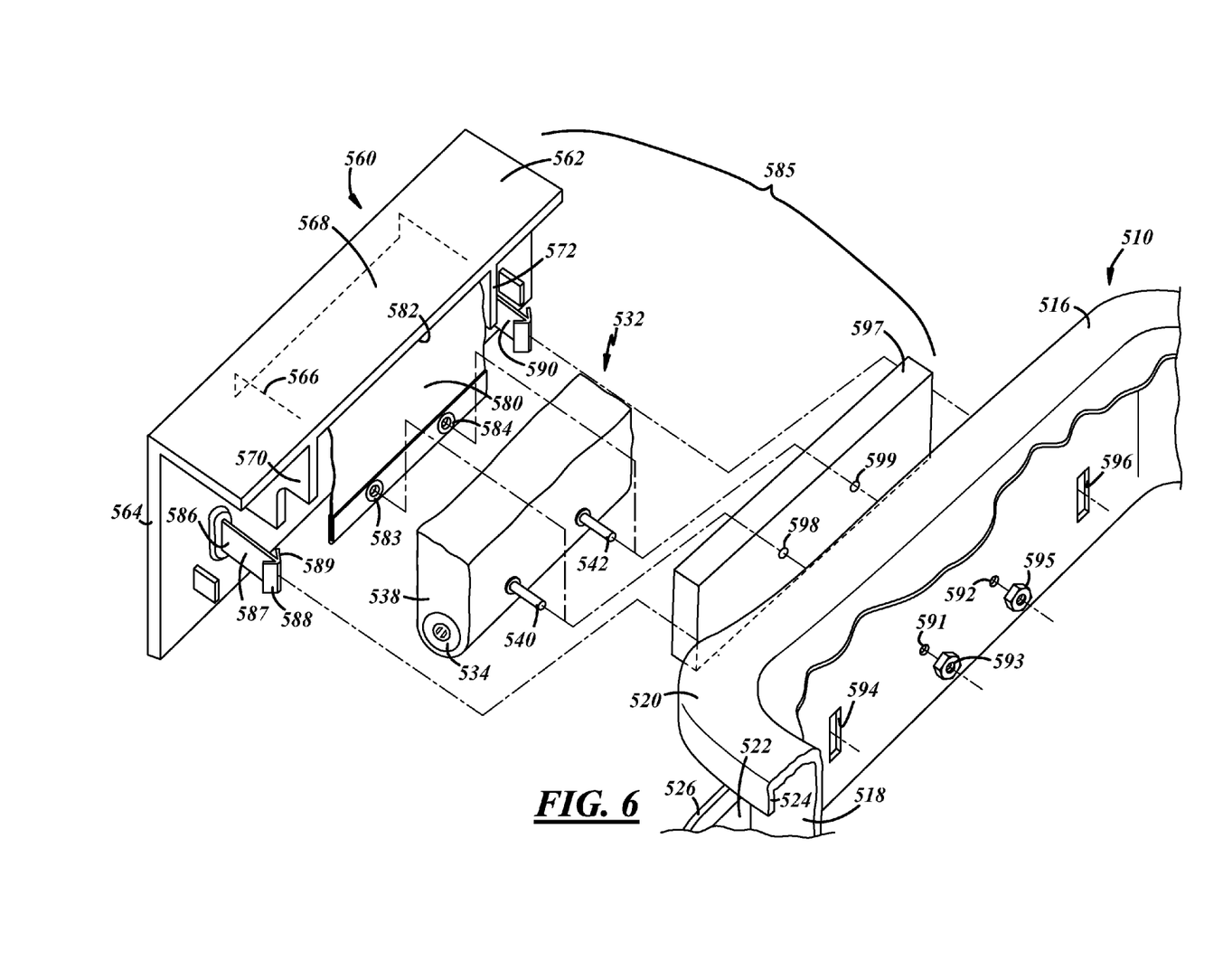
FIG. 6 is an exploded view showing still another embodiment of the invention.

Referring to FIG. 6, another embodiment of the invention is shown. As seen in FIG. 6, the seat bottom frame 510 includes a C-shaped channel 516 that can be integral with the seat bottom frame 510. Alternatively, the C-shaped channel 516 can be a separate part that is welded or attached onto the outboard side of the seat bottom frame 510. As seen in FIG. 6, the C-shape of the C-shaped channel 516 includes a vertical wall 518, a top wall 520, a bottom wall 522, a downturned flange 524 that extends from the top wall 520, and an upturned flange 526 that extends from the bottom wall 522.

An airbag assembly, generally indicated at 532, is a so-called soft-pack airbag assembly in which an inflator 534 and a folded up airbag are contained within a soft housing 538 that is constructed from flexible material such as nylon fabric or Mylar. A pair of threaded studs 540 and 542 extend laterally from the inflator 534. When the inflator 534 is activated, the soft housing 538 will tear open to release the inflating airbag, typically at a weakened portion of the housing 538 that has small slots cut into it.

An airbag cover 560, of molded plastic, has a top wall 562 and a vertical wall 564. The top wall 562 has a tear seam 566 molded integrally therewith to create an integral airbag door 568 within the top wall 562 of the cover 560. The tear seam 566 is provided by a localized reduction in the thickness of the molded plastic of the airbag cover 560. The airbag cover 560 has an enclosure molded integrally therewith and underlying the door 568, and includes end walls 570 and 572. The airbag cover 560 also has an airbag chute 580. The airbag chute 580 is a flexible material, such as nylon fabric or Mylar, and has a top edge 582 that is suitably attached to the airbag cover 560 such as by molding it into cover 560 or heat staking it. The lower end of the chute 580 has a pair of eyelets 583 and 584. The airbag assembly 532 is assembled into the cover 560 by lifting the chute 580 and rotating the bottom edge of the chute 580 around the airbag assembly 532, and then slipping the eyelets 583 and 584 over the threaded studs 540 and 542 and finally rotating the airbag assembly 532 into position inside the airbag cover 560. Then, a filler strip 597 is installed over the airbag assembly 532 by inserting the threaded studs 540 and 542 through aligned holes 598 and 599 provided in the filler strip 597. The holes 598 and 599 are preferably sized to create an interference with the studs 540 and 542 so that the filler strip 597 will assist in retaining the airbag assembly 532 within the airbag cover 560. In addition, the ends of the soft-pack inflator 534 are captured between the end walls 570 and 572 of the airbag cover 560. Thus the airbag cover 560 and the airbag assembly 532 have been attached together to form a preassembled module 585.

The vertical wall 564, of the airbag cover 560 has a fastener element 586 including a stem 587, and prongs 588 and 589. The other end of the vertical wall 564 has a similar fastener element 590 extending therefrom.

Next, the preassembled module 585 is attached to the seat bottom frame 510 by attaching the airbag cover 560 to the seat bottom frame 510. The airbag assembly 532 is simultaneously mounted on the seat bottom frame 510 with cover 560 because the airbag assembly 532 has already been mounted on the airbag cover 560. As the airbag cover 560 is moved rightwardly as viewed in FIG. 6, the threaded studs 540 and 542 of the airbag assembly 532 will become inserted respectively into holes or apertures 591 and 592 provided in the seat bottom frame 510. Then, nuts 593 and 595 are installed onto the threaded studs 540 and 542. Simultaneously, the fastener elements 586 and 590 are inserted into slots 594 and 596 of the seat bottom frame 510, where the prongs 588, 589 will become entrapped in order to mount the airbag cover 560 on the seat bottom frame 510. Nuts 593, 595 are then driven onto threaded studs 540, 542.

Thus, the preassembled module 585 is attached to the seat bottom frame 510 by attaching the airbag cover 560 to the seat bottom frame 510. The airbag assembly 532 is simultaneously mounted on the seat bottom frame 510 with cover 560 because the airbag assembly 532 has already been mounted on the airbag cover 560. Thus it is seen that the invention provides efficiencies and advantages in the assembly of a pelvic airbag device in a motor vehicle by providing a preassembled module including the inflatable airbag assembly and its plastic cover that carries integral fasteners for enabling the mounting of the preassembled module onto the outboard side of a seat bottom frame.

As shown in FIGS. 1, 4 and 5, the airbag assembly can have a rigid housing with rigid walls that will direct the inflating airbag upwardly out of the housing and through the top opening provided in the airbag cover. Alternatively, the airbag assembly can be a soft-pack airbag assembly of the type in which the inflator and folded up airbag are contained within a housing having walls of flexible material such as Mylar or nylon, as shown in FIGS. 2, 3, and 6. In the case of the soft-pack airbag assembly, an airbag cover can be provided with auxiliary walls and features that will direct the deploying airbag upwardly through the top opening of the airbag cover. For example, in FIG. 2, a molded plastic enclosure is formed integrally with the cover for directing the deploying airbag. In addition, FIG. 2 shows the example of a flexible chute of flexible material that surrounds a side of the airbag assembly to direct the deploying airbag. In addition, FIG. 2 shows the option of a filler block that can engage against the side of the soft-pack housing to direct the inflating airbag by preventing the airbag from expanding into the interior space of the C-shaped channel 116. In addition, FIG. 3 shows a mounting bracket or backing plate that is attached on the inboard or on the inboard and bottom side of the soft-pack airbag assembly for directing the inflating airbag upwardly toward the top opening.

It will be understood that the push-in type fastener of FIG. 2 comprised of a stem 187 and prongs 188 and 189 is just one example of a push-in or snapped together fastener that can be molded integrally on the plastic airbag cover for snap type insertion into apertures provided in the seat bottom frame.

Furthermore, although the drawings herein show the example of a seat bottom frame comprised of a C-shaped channel having top and bottom walls and upturned and downturned flanges, it will be understood that the modular airbag assembly of this invention can be installed on seat bottom frames having other shapes and constructions.

Although the molded plastic airbag cover shown herein is shown as having a top wall and a vertical wall, it will be understood that additional walls and shapes can be added, for example to close out the ends of the airbag cover, or to close out the bottom of the airbag cover, as needed to mate with complementary pieces of molded seat bottom trim as conventionally employed in creating an aesthetically pleasing vehicle interior.

The several embodiments shown in the drawings herein employ various fastener elements where a bolt or pronged stem or the like is described as extending through a hole, a slot, or an opening. It will be understood that the terms "hole", "slot" and "opening" are generally interchangeable and only imply a variety in size or shape, such as round, or elongated, or rectangular.

Finally, seats use different means to attach trim and components beyond what is shown in the drawing figures herein. The designs presented can be geometrically modified to interface with other attachment means, such as a bar to attach outer seat cloth/leather and electrical components/wire routing that may be nearby.

What is claimed is:

1. An airbag module for mounting on an outboard side of a vehicle seat bottom frame having a vertical wall, comprising:
  an airbag assembly including a housing, an inflator within the housing, and an airbag folded within the housing;
  a molded plastic airbag cover including a top wall having an airbag opening therein through which at least a portion of the airbag is inflatable, and a vertical depending wall adapted to overlie the vertical wall of the seat bottom frame in spaced relation therefrom to conceal at least a portion of the airbag assembly, said housing having fastener elements mounting the housing on the airbag cover;
  and said vertical depending wall of said airbag cover having fastener elements thereon extending therefrom into engagement with the vertical wall of the seat bottom frame for mounting the airbag cover on the seat bottom frame.

2. The airbag module of claim 1 further comprising said fastener elements for mounting the airbag cover on the seat bottom frame being one or more threaded elements.

3. The airbag module of claim 2 further comprising the one or more threaded elements being carried on the airbag cover and extending through complementary openings provided in the seat bottom frame.

4. The airbag module of claim 1 further comprising said fastener elements for mounting the airbag cover on the seat bottom frame being molded into the airbag cover and extending into complementary openings provided in the seat bottom frame.

5. The airbag module of claim 1 further comprising the housing having a closure panel including a door that closes the airbag opening of the top wall and the door opens upon airbag inflation.

6. The airbag module of claim 5 further comprising at least one of the walls of the airbag cover being adjacent the housing and having a peripheral flange supporting the door of the housing.

7. The airbag module of claim 1 further comprising the airbag opening of the airbag cover being provided within top wall of the airbag cover by a tear seam defining a door in the cover that opens upon airbag inflation.

8. The airbag module of claim 1 further comprising the housing having at least one rigid wall directing the inflating airbag upwardly through the airbag opening of the top wall.

9. The airbag module of claim 1 further comprising the housing being formed of flexible material and the airbag cover having at least one auxiliary wall thereon that directs the inflating airbag upwardly through the airbag opening.

10. The airbag module of claim 1 further comprising the housing being formed of flexible material and the housing has a hanger bracket attached thereto for mounting the housing on the cover, and the hanger bracket directs the inflating airbag upwardly through the airbag opening.

11. The airbag module of claim 10 further comprising a flexible chute having an edge mounted on the airbag cover and wrapping around the folded airbag and assisting in directing the inflating airbag upwardly upon inflation of the airbag.

12. The airbag module of claim 1 further comprising a rigid insert mounted between the housing and the vertical wall of the seat bottom frame for directing the inflating airbag upwardly through the airbag opening.

13. The airbag module of claim 1 further comprising said fastener elements mounting the housing on the airbag cover also providing at least a portion of the fastener elements for mounting the airbag cover on the seat bottom frame.

14. The airbag module of claim 1 further comprising said fastener elements mounting the housing on the airbag cover being separate from the fastener elements for mounting the airbag cover on the seat bottom frame.

15. An airbag module for mounting on an outboard side of a vehicle seat bottom frame having a vertical wall, comprising:
an airbag assembly including a housing, an inflator within the housing, and an airbag folded within the housing, said housing being a flexible material that tears open upon inflation of the airbag;
a molded plastic airbag cover including a top wall having an airbag opening therein through which the airbag is inflatable, and a vertical depending wall adapted to overlie at least a portion of the vertical wall of the seat bottom frame in spaced relation therefrom to conceal the airbag assembly, said airbag cover having auxiliary walls provided on the airbag cover to direct the inflating airbag upwardly to the airbag opening upon inflation of the airbag;
said housing having fastener elements mounting the housing on the airbag cover;
and said vertical depending wall of said airbag cover having fastener elements thereon extending therefrom into engagement with the vertical wall of the seat bottom frame for mounting the airbag cover on the seat bottom frame.

16. The airbag module of claim 15 further comprising said fastener elements of the airbag cover being one or more threaded elements carried on the airbag cover and extending through complementary openings provided in the seat bottom frame.

17. The airbag module of claim 15 further comprising said fastener elements of the airbag cover being fastener elements molded integrally with the airbag cover and extending into complementary openings provided in the seat bottom frame.

18. The airbag module of claim 15 further comprising the top wall of the airbag cover having a tear seam defining a door that opens upon airbag inflation.

19. The airbag module of claim 15 further comprising the airbag assembly having a hanger bracket mounted on the housing and having tabs extending through features provided in the cover to mount the airbag assembly on the cover.

20. The airbag module of claim 19 further comprising the hanger bracket having a floor that underlies the housing.

21. The airbag module of claim 15 further comprising a flexible chute having an edge mounted on the airbag cover and wrapping around the folded airbag and attached thereto by the fastener elements mounting the housing on the airbag cover to direct the inflating airbag upwardly upon inflation of the airbag.

22. The airbag module of claim 15 further comprising a rigid insert mounted between the housing and the vertical wall of the seat bottom frame for directing the inflating airbag upwardly through the airbag opening.

23. The airbag module of claim 15 further comprising said auxiliary walls provided on the airbag cover to direct the inflating airbag upwardly to the airbag opening upon inflation of the airbag including at least walls extending downwardly from the top wall or inwardly from the vertical depending wall at ends of the housing.

24. An assembly process for mounting an airbag module on an outboard side of a seat bottom frame comprising:
providing an airbag assembly including a housing, an inflator within the housing, and an airbag folded within the housing;
mounting the airbag assembly to an adjacent airbag cover by said housing having fastener elements mounting the housing on the airbag cover; said airbag cover being of molded plastic and including a top wall having an airbag opening therein through which at least a portion of the airbag is inflatable, and a vertical depending wall adapted to overlie the vertical wall of the seat bottom frame in spaced relation therefrom to conceal at least a portion of the airbag assembly;
and then after mounting the airbag assembly on the airbag cover; mounting the airbag cover and airbag assembly to the seat bottom frame as a sub-assembly by said vertical depending wall of said airbag cover having fastener elements thereon extending therefrom into engagement with the vertical wall of the seat bottom frame for mounting the airbag cover on the seat bottom frame with the vertical depending wall of said airbag cover spaced from the vertical wall of the seat bottom frame and the airbag assembly concealed between the airbag cover and the seat bottom frame.

* * * * *